B. D. SANDERS.
Hoes.
No. 149,885.                          Patented April 21, 1874.
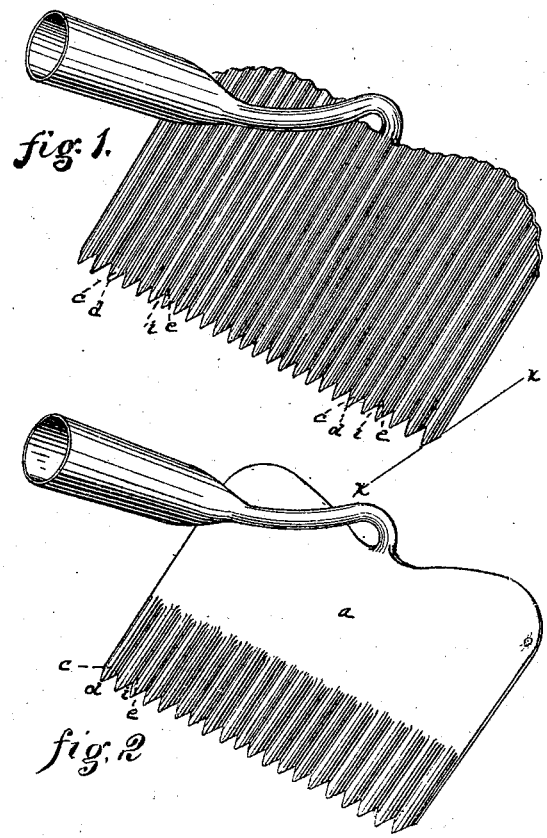

UNITED STATES PATENT OFFICE.

BENJAMIN D. SANDERS, OF CROSS CREEK TOWNSHIP, BROOKE COUNTY, WEST VIRGINIA.

IMPROVEMENT IN HOES.

Specification forming part of Letters Patent No. 149,885, dated April 21, 1874; application filed August 18, 1873.

*To all whom it may concern:*

Be it known that I, BENJAMIN D. SANDERS, of Cross Creek township, in the county of Brooke and State of West Virginia, have invented a new and useful Improvement in Hoes; and I do hereby declare the following to be a full, clear, and exact description thereof, reference being had to the accompanying drawing forming a part of this specification, in which—

Figure 1 is a perspective view of my improved hoe, having corrugations extending across the blade; and Fig. 2 is a like view of the same, having corrugations extending back a short distance from the serrated edge.

Like letters refer to like parts in the several figures.

My invention relates solely to certain improvements in the ordinary farm-hoe; and consists in a hoe-blank of the class referred to, made with a corrugated edge, beveled on its rear or ground face. The object of this invention is to furnish a better cutting-edge to the ordinary farm-hoe—an edge which wears uniformly, keeping the hoe sharp, whereby hard soils may be worked with greater facility and less expenditure of strength, and which is also an edge that adapts the hoe for use as a weeding-hoe where heavy growths of weeds are to be operated upon, so that the same implement is capable of use in all cases where the ordinary hoe is used, and at the same time may be employed as a weeding-hoe, when required therefor.

To enable others skilled in the art to make and use my invention, I will now proceed to describe its construction.

To the usual hoe-blank I impart a series of small corrugations, extending entirely across the blade, as shown in Fig. 1, or for only a short distance back from the cutting-edge, as shown in Fig. 2. This may be done by subjecting the blank, while hot, to the action of suitable rolls or dies, after which the cutting-edge is sharpened, by shearing or grinding, in the plane indicated by the line $x\ x$, Fig. 1. The apexes $c$ of these corrugations run back from the teeth $d$, and the bases from the serrations $i$.

The line of wear of a hoe of this description, on account of its position when in use, is oblique to the hoe, or in the same plane in which the blank is first ground; therefore, as the hoe wears, it wears in a plane parallel to the line $x\ x$, wearing off the bases or lower parts of the corrugations in advance of the apexes, thereby preserving the serrated edge $b$ until the hoe has worn back to the end of the corrugations. When the corrugations extend clear across the blade, the serrated edge is coexistent with the hoe. Moreover, the blade itself is stiffened and strengthened by this construction.

I am aware that a corrugated and beveled edge has been incorporated into the construction of a special form of weeding-hoe suitable for use in light gardening, as described in patent to A. Coleman, April 28, 1868, and hence I make no claim to such features of construction, except as an element in the kind or class of hoes referred to; but

Having thus described my invention, I claim—

The blade $a$ of a farm-hoe, having the corrugated and beveled cutting-edge, substantially as set forth.

In testimony whereof I, the said BENJAMIN D. SANDERS, have hereunto set my hand.

BENJAMIN D. SANDERS.

Witnesses:
 A. S. NICHOLSON,
 JAMES I. KAY.